Figure 2:
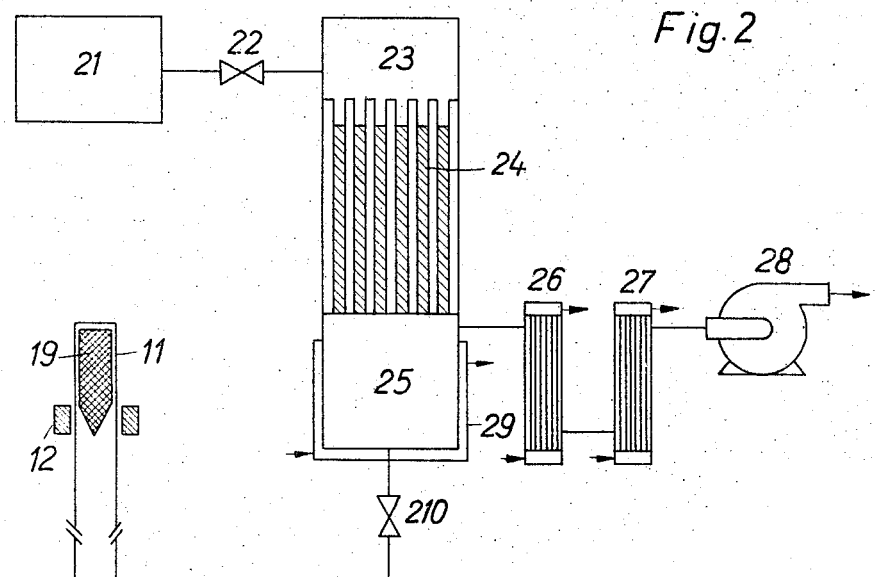

Sept. 26, 1967  C. ZINSSTAG  3,344,166
PREPARATION OF MALONIC ACID DINITRILE
Filed Dec. 16, 1964

United States Patent Office 3,344,166
Patented Sept. 26, 1967

3,344,166
PREPARATION OF MALONIC ACID DINITRILE
Christoph Zinsstag, Visp, Switzerland, assignor to
Lonza Ltd., Basel, Switzerland
Filed Dec. 16, 1964, Ser. No. 418,681
Claims priority, application Switzerland, Dec. 19, 1963,
15,639/63
4 Claims. (Cl. 260—465.2)

This invention relates to a catalytic process for the preparation of malonic acid dinitrile, and more particularly to a process for the preparation of malonic acid dinitrile from cyanoacetamide.

Cyanoacetamide is a compound which is decomposed, even at strongly reduced pressure, at temperatures above 150° C., ammonia being split off, and which at temperatures above 250° C. is converted to a red resin of indefinite composition. Malonic acid dinitrile forms with ammonia an unstable mixture liable to explosion. For these reasons, the dehydration of cyanoacetamide was carried out heretofore in the liquid phase at relatively low temperatures of e.g. 60 to 100° C. in the presence of at least stoichiometric amounts of chemical dehydrating agents such as phosphorus oxychloride or phosphorous pentachloride. These processes are commercially not attractive because they involve the use of expensive chemical dehydrating agents; in addition, the generated hydrochloric acid presents considerable corrosion problems, and the complete removal of the dehydrating agent is difficult.

It is a principal object of the invention to provide an efficient vapor phase process for the conversion of cyanoacetamide to malonic acid dinitrile, which, for the sake of brevity, will be sometimes called hereafter malononitrile.

Other objects and advantages will be apparent from a consideration of the specification and claims.

I have found that cyanoacetamide can be converted in the gas phase to malonic acid dinitrile with high yields when cyanoacetamide vapor is passed under reduced pressure and at elevated temperature over a catalyst which contains polyphosphoric acid.

The invention comprises passing vaporized cyanoacetamide under a pressure of 0.5 to 100 mm. Hg in the temperature range of 250 to 450° C., preferably at temperatures between 300 and 400° C., over a catalyst which is formed of an acid or neutral carrier and polyphosphoric acid.

One method of carrying out the invention consists in first melting the cyanoacetamide under normal pressure or in vacuo, and in evaporating then the melt in vacuo. In order to prevent decomposition of the cyanoacetamide, I prefer to vaporize the same at a pressure of 0.5 to 5 mm. Hg.

The dehydration is carried out at a pressure of 0.5 to 100 mm. Hg. Lower pressures should be avoided because of the difficulty to separate the formed malononitrile; higher pressures have the drawback of decomposition of cyanoacetamide and clogging of the apparatus by the resins thus formed. The required apparatus is simplified if evaporation and reaction of the cyanoacetamide are carried out at substantially the same pressure.

The dehydration temperature is maintained in the range of 250 to 450° C. At lower temperatures, the degree of conversion is too strongly reduced, at higher temperatures the decomposition of cyanoacetamide increases quickly.

I have found it of advantage to pass cyanoacetamide over the catalyst in an amount of 20 to 80 g./hour per 1 liter of catalyst (density about 500 to 700 g./liter). Thereby, a gas mixture is produced which consists essentially of malononitrile, water, and unreacted cyanoacetamide. This mixture is condensed in vacuo in water and brine coolers arranged in series.

The term "polyphosphoric acid" as used herein designates the thermal dehydration product of orthophosphoric acid which is considered to be essentially a mixture of compounds $H_{n+2}P_nO_{3n+1}$, where $n$ is an integer between 1 and 15, and which may contain, in addition, pyrophosphoric and/or metaphosphoric acid.

The polyphosphoric acid catalyst is prepared by forming the acid on a neutral or acidic carrier by thermally splitting off water from orthophosphoric acid.

In a preferred embodiment of the invention, the catalyst is formed on a carrier, consisting essentially of silica, from orthophosphoric acid in a baking process splitting off the water. The silica containing starting material and the orthophosphoric acid, in a weight ratio of $SiO_2:H_3PO_4$ from 1:4 to 1:10, are mixed to a paste which, preferably after a preliminary drying, is baked at a temperature of 200 to 350° C. The baking time depends on the temperature; 10 to 80 hours are sufficient. Catalysts prepared at a temperature in excess of 250° C. have substantially no hygroscopicity.

Suitable silica containing starting materials are, for instance, finely ground quartz sand, silica gel, and preferably kieselguhr, containing at least 90% $SiO_2$; it must be free of alkaline impurities as already traces of such impurities can affect the effectiveness of the catalyst. The phosphoric acid must contain as little water as possible and have preferably an $H_3PO_4$ content of more than 85% in order to avoid unnecessary losses of energy in the drying and baking operations.

The thus prepared catalyst may contain also small amounts of boric oxide. Such admixture makes it solid already at lower baking temperatures, for instance at 120° C. However, as the activity of the catalyst decreases with increasing content of boric oxide, the content of boric oxide should not exceed 10 percent by weight.

The grain size of the catalyst is about 1.5 to 30, preferably 5 to 15 mm. Coarser grains have the drawback of a smaller surface, and smaller grain offer greater resistance to the passage of the gases.

In a similar manner, the water soluble polyphosphoric acid can be formed on other carrier materials. Said carriers and their components must be neutral or acidic, such as activated carbon, silica materials, or boric oxide ($B_2O_3$), which latter, in this case, is used only as a carrier and not as admixture to the catalyst proper. The effectiveness and life of such catalysts are, however, less than that of the catalysts described hereinabove consisting of polyphosphoric acid on silica.

A catalyst whose activity has decreased by long use, can be reactivated by impregnation with the orthophosphoric acid and baking.

Figure 1:
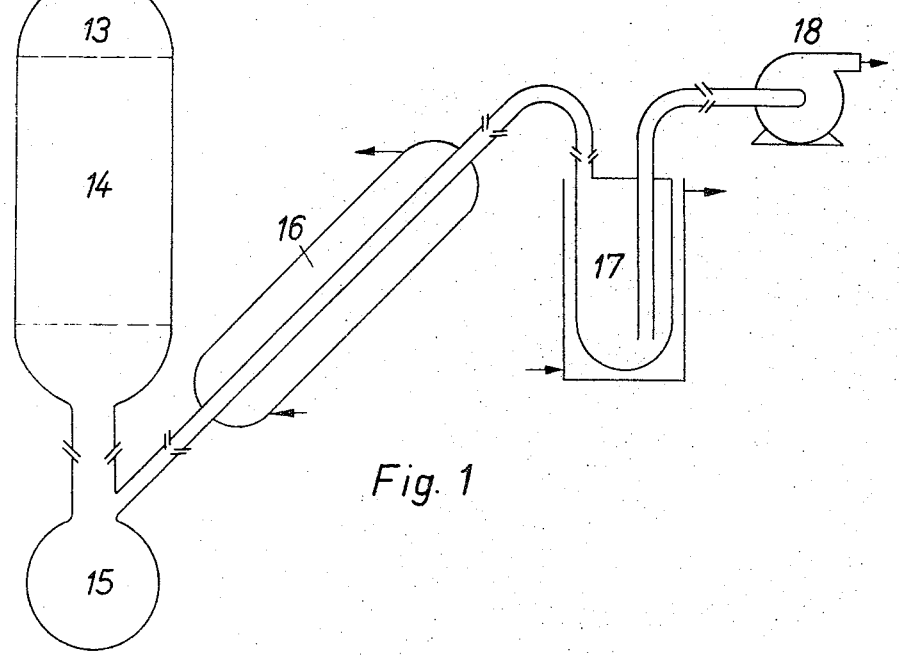

Flow sheets of the process in diagrammatic form are shown in the accompanying drawings in which FIG. 1 shows an apparatus where the cyanoacetamide is evaporated under vacuo, and FIG. 2 shows a similar apparatus for evaporation of the cyanoacetamide under atmospheric pressure.

Referring to the drawings and first to FIG. 1, the process is operated as follows: The glass tube 11 with ground-in joints (length 30 cm., inner diameter 18 mm.) contains a candle of solid cyanoacetamide 19 and is mounted on the reaction vessel 13. The cyanoacetamide is heated by a vertically displaceable heating ring 12, like in a zone melting process, in such a way that the molten substance falls dropwise on the heated catalyst 14, and is vaporized. The reaction vessel 13 is a cylinder of refractory glass.

The apparatus shown in FIG. 2 comprises the melting vessel 21, which is heated at 130° C., for melting the cyanoacetamide at normal pressure. The molten cyanoacetamide is passed through an inlet valve 22 into an instantaneous vaporizer 23, which is operated in vacuo, and into reactor 24 comprising a nest of tubes filled with the catalyst. The formed malononitrile is condensed in the collector 25 which is water-cooled by the jacket 29. The collector is periodically discharged by passing steam into the jacket 25 so as to melt the charge and draining it through the valve 210. Separators 26 and 27 are provided for removing any entrained malononitrile and the water of reaction. The aggregate 28 produces the vacuum and removes at its pressure side the residual gases which consist of some $NH_3$, water, CO and air.

The following examples disclose more fully the preparation of malonic acid dinitrile in accordance with the process of this invention but they are not intended as limitations for there are numerous variations possible in the proportions and operating conditions without departing from the teachings herein.

EXAMPLE 1

*Preparation of the catalyst:* 1 part by weight of kieselguhr (östgur 12 "0") is mixed with 5 parts by weight of 85% phosphoric acid, and the obtained paste is dried at a temperature of 150–180° C. for a period of 48 hours and pressed to tablets or granulated. The material is then baked for 12 to 15 hours at a temperature of 250–260° C. After cooling, the tablets or grains are separated from the fines by means of a 1.5 mm. mesh screen.

The *dehydration* of the cyanoacetamide is carried out in the apparatus shown in FIG. 1 where the reaction vessel 13 has a length of 30 mm. and a diameter of 7.5 cm. and is filled with a volume of 850 ml. catalyst 14 (density 600 g./liter) which is heated at a temperature of 350 to 360° C.

The crude malononitrile is condensed by cooling at about 30° C. in the reflux cooler 16 and is collected in the flask 15 while the water split off is retained in the cold trap 17. The whole apparatus is kept at a pressure of 1 to 3 Torr by means of the vacuum pump 18 which has a suction volume of at least 3 m.²/h. The catalyst load is 30 to 35 g. per liter catalyst per hour.

After purification by distillation, the yield of malononitrile ($m=30.5°$ C.) is 89 percent, calculated on the introduced cyanoacetamide. Excepting a small amount of a brown resin, there are no by-products.

EXAMPLE 2

*Preparation of the catalyst:* 1 part by weight of white kieselguhr (Celite 263) and 5 parts by weight of 85% phosphoric acid are mixed to a paste, which is placed on sheets protected by a heat and acid resistant lining, and baked for 20 hours at a temperatures which are increased to 250–330° C.

*Dehydration:* Cyanoacetamide is converted to malononitrile on said catalyst at a temperature of 345–360° C. in the apparatus of FIG. 1. 30 g. cyanoacetamide per hour are dropped on 500 g. of the catalyst. A crude product containing 96 percent of malononitrile is obtained in a yield of 95 percent, which product can be converted by simple distillation with a yield of 98% into pure malononitrile.

*Regeneration of catalyst:* After about 200 hours of operation, the catalyst is regenerated by renewed impregnation with phosphoric acid and baking at a temperature of 250 to 330° C. The regeneration can be repeated as often as the carrier is still capable of taking up phosphoric acid.

EXAMPLE 3

*Preparation of catalyst:* 28.2 kg. of kieselguhr and 125 kg. of 85% phosphoric acid were ground to a paste. This paste was dried for 72 hours in vacuo at 195° C., comminuted, and after comminution freed from the fines.

*Dehydration* was carried out in the apparatus of FIG. 1 at various temperatures and with varying amounts of cyanoacetamide with respect to the amount of catalyst used.

The following runs were made:

*Run a* at 295 to 305° C., 41 g. of cyanoacetamide per hour and liter of catalyst were reacted with a yield of 85%. The obtained light yellow product had a purity or 96%.

*Run b* at 350° C. with 37 g./hour of cyanoacetamide per liter of catalyst produced a yield of 87% of a yellow-orange malononitrile, purity 95%.

*Run c* at 380–390° C. with 42 g./hour of cyanoacetamide per liter of the catalyst produced a crude product of red-orange color with a yield of 88%; malononitrile content 94%.

*Run d* at 395–400° C. with 50 g./hour of cyanoacetamide per liter of catalyst produced a 94% malononitrile of darker shade in a yield of 87.4%.

*Run e* was carried out at a temperature of 345 to 360° C. but with a larger amount of cyanoacetamide per unit of time and catalyst. With an hourly charge of 71 g. of cyanoacetamide per liter of catalyst, the yield was 82 percent, the purity of the malononitrile 90%.

The products of all runs could be converted by simple distillation into pure malonic acid dinitrile ($m=30.5$ to $31.5°$ C.) with a yield of 98 percent. It was contaminated only with traces of cyanoacetamide and cyanoacetic acid.

EXAMPLE 4

The reaction was carried out in the apparatus shown in FIG. 2, where the melting vessel was heated at 130° C. Trap 26 was cooled with cold water and trap 27 with a brine at a temperature of −10 to −30° C. 6 kg./hour of cyanoacetamide were vaporized in vaporizer 23 at a pressure of 5 Torr and passed through the catalyst bed, which consisted of 150 tubes of 40 mm. diameter filled to a height of 100 cm. with the catalyst of Example 3. Within 20 hours, 93 kg. of crude malononitrile were drained off which produced by distillation 70 kg. of pure malononitrile ($m=30–31°$ C.)

EXAMPLE 5

*Preparation of catalyst:* 10 kg. Röstgur (see Example 1) and 40 kg. of phosphoric acid (85%) are intimately mixed and spread as a layer of 1 cm. on plates lined with an acid-resisting coating. The mass is baked for a period of 20 hours at a temperature of 250° C., comminuted and placed in an apparatus as shown in FIG. 2. The height of the layer in the catalyst bed is 90 cm., the diameter of the tubes 40 mm., and the number of tubes 54.

*Dehydration:* About 2 kg./hour of liquid cyanoacetamide are passed into the vaporizer which is heated at 180° C. The vacuum therein is 4 mm. Hg. After 20 hours, 33 kg. of a product can be molten out of the collector. 26 kg. of pure malononitrile ($m=30–31°$ C.) can be distilled off from said crude product.

EXAMPLE 6

*Preparation of catalyst:* A kieselguhr containing 6% Fe is washed with hydrochloric acid to remove the iron. After drying, the kieselguhr is mixed in a weight ratio of 1:5 with 85% phosphoric acid, and the mass is baked for 20 hours at a temperature of 250° C. 400 g. of finished catalyst are filled in form of 1 cm.³ cubes in a bed of 850 cm.³ volume.

*Dehydration:* The reaction takes place at 360° C. in the apparatus shown in FIG. 1. The vacuum amounts to 0.5 to 1.5 mm. Hg, and the rate of feed of the cyanoacetamide is 25 g. per hour. The crude malononitrile produced over a period of 18 hours is distilled at 0.8 mm. Hg. 332 g. of malononitrile (95.9%) $m=30–31°$ C., are obtained.

EXAMPLE 7

In order to determine the optimum period of use, the catalyst of Example 2 is subjected for 14 days each day for 8–9 hours to a charge with cyanoacetamide as follows: In the manner described in Example 2, about 25 g./hour of cyanoacetamide are charged onto 358 g. of catalyst. After each daily run, the yield of crude undistilled malononitrile as well as that of purified product ($m=31.5$–$31.9°$ C.) were determined. The results of the runs, as listed in the following table, show that on the first day the apparatus is not yet fully efficient and that after the 12th day the activity of the catalyst starts falling. After a throughput of a total of about 2700 g. of cyanoacetamide, the catalyst is not yet exhausted but should be reactivated. The catalyst consumption, calculated on the 14 days' operation, is about 190 g./kg. of pure product with an average yield of about 90 percent.

TABLE

| Day | CAA consumption at respective day (g.) | Total CAA consumption (g.) | Yield of crude MADN at respective day (g.) | Yield of pure MADN at respective day (g.) | Yield of pure MADN at respective day, calculated on CAA, percent | Total pure MADN produced (g.) | Average total yield of pure MADN, calculated on CAA, percent |
|---|---|---|---|---|---|---|---|
| 1 | 89.6 | 89.6 | 58.5 | 54.0 | 76.6 | 54.0 | 76.6 |
| 2 | 220.9 | 310.5 | 168.5 | 158.9 | 91.2 | 212.9 | 87.3 |
| 3 | 207.8 | 518.3 | 158.9 | 154.2 | 94.4 | 367.1 | 88.0 |
| 4 | 231.5 | 749.8 | 170.9 | 162.8 | 89.4 | 529.9 | 90.0 |
| 5 | 224.7 | 974.5 | 175.4 | 165.1 | 93.5 | 695.0 | 90.8 |
| 6 | 206.9 | 1,181.4 | 166.2 | 157.8 | 96.8 | 852.8 | 91.8 |
| 7 | 137.2 | 1,318.6 | 102.6 | 93.0 | 87.5 | 945.8 | 91.4 |
| 8 | 217.2 | 1,535.8 | 164.3 | 156.1 | 91.4 | 1,101.9 | 91.4 |
| 9 | 137.3 | 1,673.1 | 113.8 | 104.5 | 96.7 | 1,206.4 | 91.6 |
| 10 | 233.2 | 1,906.3 | 182.5 | 167.8 | 91.5 | 1,374.2 | 91.8 |
| 11 | 186.5 | 2,092.8 | 147.6 | 131.0 | 89.6 | 1,505.2 | 91.6 |
| 12 | 224.7 | 2,317.5 | 175.4 | 154.8 | 87.7 | 1,662.0 | 91.4 |
| 13 | 168.2 | 2,485.7 | 124.0 | 108.5 | 82.2 | 1,770.5 | 90.7 |
| 14 | 213.0 | 2,698.7 | 165.6 | 128.1 | 76.6 | 1,898.6 | 89.7 |

CAA=Cyanoacetamide. MADN=Malonic acid dinitrile.

EXAMPLE 8

*Preparation of catalyst:* 336 g. of 85% phosphoric acid are poured over 258 g. of activated carbon having a grain size of 3–4 mm., and the mass is filled into the apparatus of FIG. 1. The vacuum is turned on, and the catalyst is baked overnight at a temperature of about 250° C.

*Dehydration:* At a pressure of 1 to 3 mm. Hg maintained in the apparatus, 506 g. of cyanocetamide are dropped onto the catalyst heated at 350 to 400° C. and vaporized. 332 g. of crude malononitrile are collected which, on distillation, produce 286 g. of pure malononitrile, corresponding to a yield of 72.2 percent, calculated on reacted cyanoacetamide.

I claim:

1. A process for the preparation of malonic acid dinitrile which comprises passing gaseous cyanoacetamide at a pressure of 0.5 to 100 mm. Hg at a temperature in the range of 250 to 450° C. over a catalyst which consists essentially of polyphosphoric acid produced by thermal decomposition of orthophosphoric acid and an acidic to neutral carrier selected from the group consisting of activated carbon, silica materials, and boric oxide.

2. The process as claimed in claim 1 wherein the temperature is 300 to 400° C.

3. The process as claimed in claim 1 wherein the cyanoacetamide is vaporized at a pressure of 0.5 to 5 mm. Hg.

4. The process as claimed in claim 1 wherein said catalylst is prepared by baking a mixture of a carrier consisting essentially of silica with orthophosphoric acid in a weight ratio $SiO_2:H_3PO_4$ of 1:4 to 1:10 at a temperature of 250 to 350° C. for at least 10 hours.

References Cited

UNITED STATES PATENTS 3,277,146   10/1966   Sennewald et al. ___ 260—465.2

JOSEPH P. BRUST, *Primary Examiner.*

CHARLES B. PARKER, *Examiner.*